United States Patent

[11] 3,583,511

| [72] | Inventor | Sture Lennart Asberg<br>Savedalen, Sweden |
|---|---|---|
| [21] | Appl. No. | 814,776 |
| [22] | Filed | Apr. 9, 1969 |
| [45] | Patented | June 8, 1971 |
| [73] | Assignee | SKF Industries Inc.<br>King of Prussia, Pa. |
| [32] | Priority | Apr. 10, 1968 |
| [33] | | Netherlands |
| [31] | | 6,805,109 |

[54] ROLLING BEARING
11 Claims, 7 Drawing Figs.

| [52] | U.S. Cl. | 180/43,<br>308/191 |
|---|---|---|
| [51] | Int. Cl. | B60k 17/30,<br>F16c 13/02 |
| [50] | Field of Search | 180/43 |

[56] References Cited
UNITED STATES PATENTS

| 2,362,978 | 11/1944 | Alden | 180/43 |
|---|---|---|---|
| 2,349,388 | 5/1944 | Sturges | 180/43 |

FOREIGN PATENTS

| 571,476 | 10/1958 | Italy | 180/43 |
|---|---|---|---|

*Primary Examiner*—Fred C. Mattern, Jr.
*Assistant Examiner*—Frank Susko
*Attorney*—Howson and Howson

ABSTRACT: A bearing assembly for a driven wheel mounting arrangement for a vehicle including a part of a homokinetic coupling, an axle member secured to said part of the homokinetic coupling and a support member on which the axle is supported, said bearing assembly comprising an outer ring for at least two rows of rolling elements including means to secure the outer ring to the support member, flange means for attaching the wheel to the axle, means defining an inner raceway surface on the axle for the rows of rolling elements characterized in that said flange means, axle and inner raceway means form an integral unit.

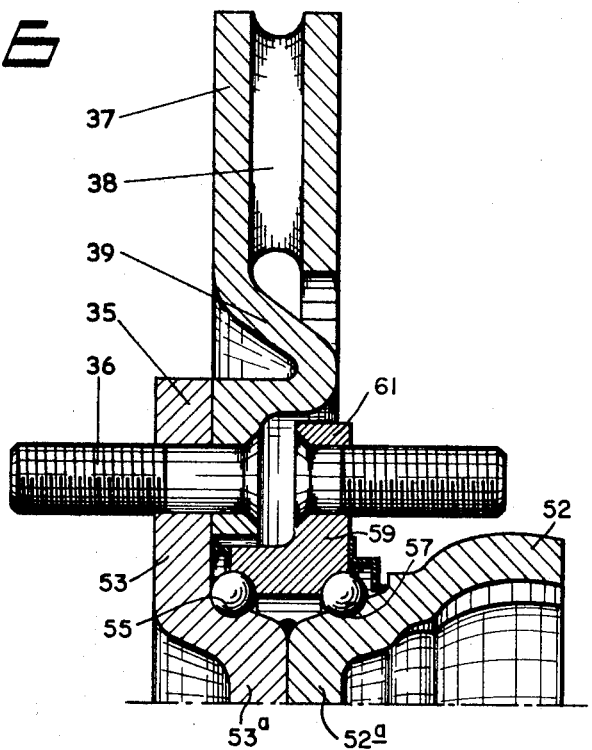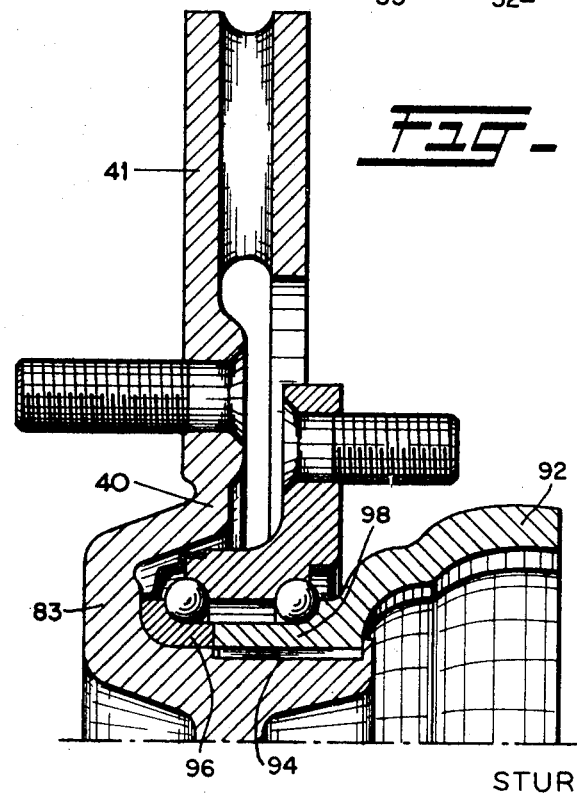

ROLLING BEARING

The present invention relates to improvements in bearing assemblies and more particularly to a bearing design for a driven wheel of a motor vehicle which is mounted on the end of an axle and is secured to one-half of a homokinetic coupling. In this assembly the axle is supported in the bearing element, for example the support member of a suspension system, by means of two roller or ball bearings, the bearing having a common outer ring for both rolls or balls and a flange for attachment of the bearing with the support member, the wheel being attached to a flange connected to the axle.

Some prior assemblies of this type, the axle is provided with a screw thread to receive a nut which, through the medium of a plate, acts as a bushing on the end of the axle, to the outside of which the inner rings of the ball bearings have been placed. The outer ring of these ball bearings is attached to the support member for example by means of bolts through openings in the flange. The bush placed on the end of the axle has been torsion-fixed coupled to the axle by means of ribs and grooves regularly distributed on the circumference, and has a flange in a radial plane perpendicular to the axle on which the brake drum or brake disc and the wheel may be attached by means of bolts. This known design aims at being a simplification with regard to most of the current designs, in which again and again two separate roller or ball bearings are used. All these known designs consist of parts demanding a very accurate handling. For instance, the end of the axle must be provided with a screw thread, keyways must have been provided in them, keyways with a true gliding towards the inside of the bush, said bush must be accurately machined and be provided with planes on the outside for the placing of the inner rings thereon.

The present invention is a simplified arrangement which essentially consists in forming the flange to which the wheel is attached with the inner rings of the ball or roller a nondetachable part of the bearing design. More specifically, in accordance with the present invention, the axle, the bearings and the flanges are formed as an integral unit that can be assembled and/or replaced in its entirety. This idea brings with it that the machining is to be carried out in a smaller number of places and other more suitable materials can be used without endangering the stability of the design. Thus there is no longer a separate bush to be placed on the end of the axle and to be locked by means of a nut, as the flange to which the wheel and the brake drum or brake disc have to be attached is forming a fixed unit with the axle. This means that the axle can be provided with a greater diameter. This means, for instance, that the part of the axle together with the part of the homokinetic coupling can be manufactured as a piece of die casting, as a pressing or from sheet metal and that the weight can be reduced by manufacturing these parts hollow.

The bearing surfaces can be ground in the material of the axle and in this case no separate inner rings need be provided. It is also possible, to use at least one inner ring, but this ring is locked in this case by the nondetachable fastening of the outer flange on the axle. When one or more inner rings are being used, then it is possible, more particularly when two inner rings are used, to use as the material of the axle a less hard but tougher material and thus to be content with a less expensive material.

According to the invention the axle may consist of two pressings either shell- or bowl-shaped nondetachably fixed to each other with their perpendicular bottom surfaces perpendicular on the center axis of the axle and forming or bearing each a bearing surface of a bearing. The nondetachable attachment may be a welded attachment, but it might also be a rivet attachment or a combination of both. The grinding in of the bearing surfaces can be done on both parts before they have been attached to each other. When separate rings are used for the inner rings, these are preferably held in place by a cold deformation occurring during the formation of the bowllike shape.

The axle may also consist of two parts that have been attached to each other in a nondetachable manner by cylindrical planes and one part of which forms a whole with the flange for the wheel and the other part forms a whole with the clutch housing and each one of these parts forms or bears a bearing surface for a roller or ball bearing.

The housing part of the homokinetic coupling that forms part of the axle, has to meet special demands in order to be able to absorb the forces occurring in this coupling. This makes high demands of the material. By halving the axle in two, parts that have been nondetachable attached to each other, one gets a freer choice in material and the unit can be considerably less expensively manufactured.

In all the types of the bearing design according to the invention the brake disc or brake drum may be nondetachably attached to the wheel flange. Said brake disc or brake drum may either form a whole with the flange or be attached to the inner side, for instance with bolts. This enables a compact design demanding less room and material and in which the brake disc or brake drum forms a whole with the unit.

These and other objects of the present invention and the various features and details of the operation and construction thereof are hereinafter more fully set forth with reference to the accompanying drawings, wherein;

FIG. 6 is a fragmentary sectional view of another embodiment of axle-bearing assembly; and FIG. 7 is a modified form of the assembly shown in FIG. 6.

Figure 1:
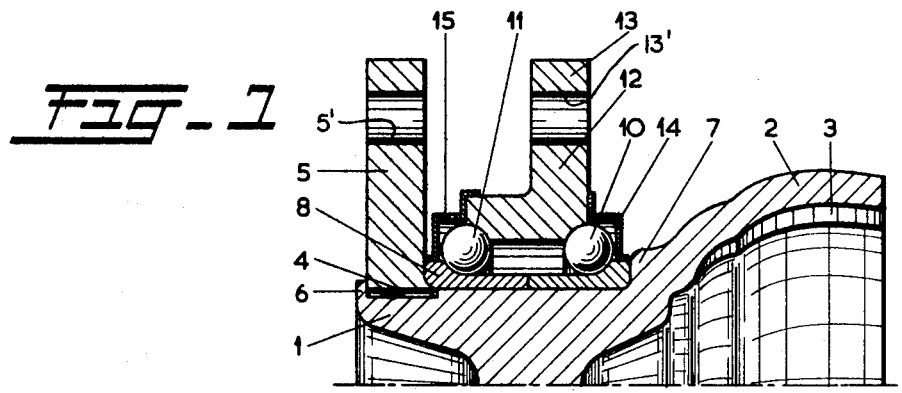
FIG. 1 is a fragmentary cross-sectional view of a portion of a homokinetic coupling incorporating an axle-bearing assembly in accordance with the present invention.

Referring now to the drawings and particularly FIG. 1 thereof, the present invention is shown in assembly with one-half of a homokinetic coupling generally designated by the numeral 2. The coupling has a plurality of tracks 3 to accommodate balls which are locked between parts of the coupling which have a hinged connection toward each other.

As illustrated, a radially outwardly directed flange 5 is mounted on the inner axial end of the axle 1. In the present instance, the axle 1 is provided with screw threads 4 to mount the flange 5 and is locked in place by cold-forming the axle to form the circumferentially extending lip 6. In the present instance, a pair of inner rings 8 and 9 having raceways or bearing surfaces for the two rows of ball bearings 10 and 11 are mounted between the flange 5 and a shoulder 7 of the axle. The bearing has a common outer ring 12 with a radially outwardly directed flange 13 having openings 13' therein whereby the outer ring may be secured to a support member or the like forming part of a suspension systems of a vehicle. Conventional seals 14 and 15 are provided for the bearing. The flange 5 is also provided with openings 5' for bolts to secure the axle to a wheel of the vehicle.

In view of the above, it is apparent that a small and compact design is provided wherein the flanges 5 and 13 are spaced close to one another to obtain comparatively small moments.

Figure 2:
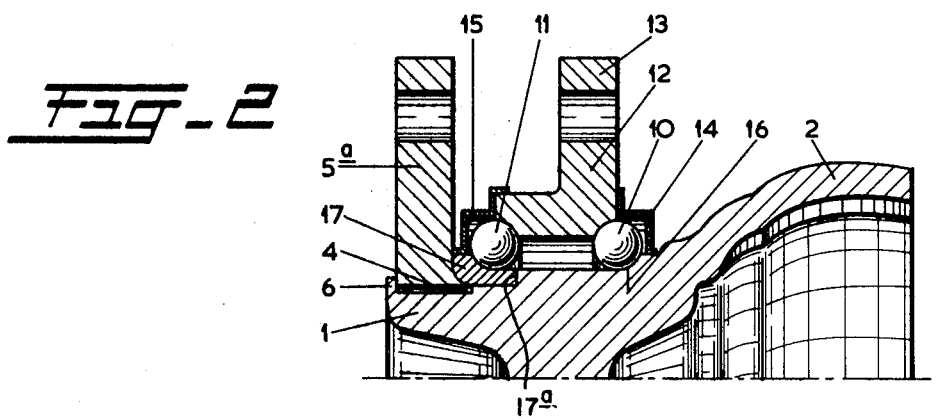
FIG. 2 is a modified form of the assembly shown in FIG. 1 wherein the bearing surface for one of the rings is ground in the outer surface of the axle.

There is illustrated in FIG. 2 a modification of the assembly shown in FIG. 1 wherein identical parts are designated by the same numeral with the letter $a$. In the present instance, the bearing surface or raceway for the inner row of balls 1 is provided by the track 16 which is ground into the axle, and the other row of balls has an inner raceway surface provided by a separate ring 17 which is supported between a shoulder $17^a$ defined by a shelf in the axle and the flange $5^a$ which is threaded onto the outer terminal end of the axle as illustrated.

Figure 3:
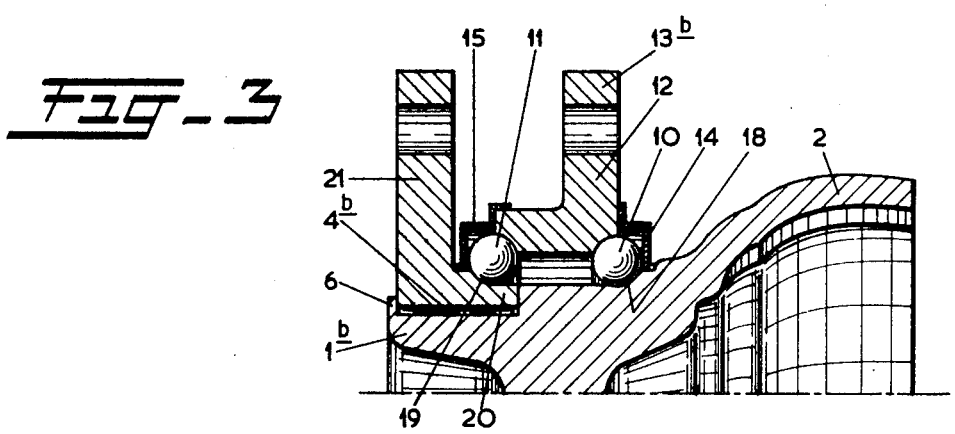
FIG. 3 is still another modified form wherein the bearing surface for one of the rows of balls is formed integrally with a flange supported on the axle.

FIG. 3 shows a further modification of the assembly shown in FIGS. 1 and 2 wherein identical parts have the same reference numeral except that the letter b is added. Note that in the present instance the inner row of balls $10^b$ rides on a bearing surface or raceway track 18 which is ground into the axle $1^b$ in the same way as in the embodiment of FIG. 2. However, in the present instance the flange 21 is of L-shaped cross section and the leg 20 of the flange is ground to provide the bearing surface or raceway track 19 for the outer row of balls $11^b$. Note that in this embodiment the flange is nondetachably secured between the lip $6^b$ and a shoulder $20b$ formed in the axle $1b$.

The unit assembly described above wherein the flange 5, 5a and 21 is fixed in place can be obtained in other ways, for example by means of a weldment.

Figure 4:
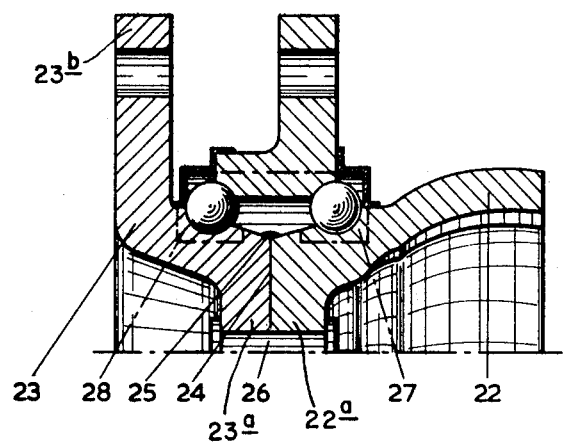
FIG. 4 is a fragmentary sectional view of a second embodiment of axle-bearing assembly in accordance with the present invention.

There is shown in FIG. 4 another embodiment of axle-bearing assembly which is of unitary construction in accordance with the present invention. In this embodiment the axle body consists of two parts pressed out of sheet steel, a bowl-shaped member 22 and a shell-shaped member 23. Each of the members has a radially inwardly directed flange $22^a$ and $23a$ respectively whereby the members are connected in the relation shown by means of rivets 26. The members may also be connected at the flanges by means of a resistance welding and in this event a rubber bead 25 is provided to prevent sparking. The inner bearing surfaces or raceways for the two rows of balls may be provided by grinding the outer peripheral surface of the members 22 and 23 as at $27a$ and $28a$. Alternately, the inner raceways may be provided by rings 27 and 28 secured in place by cold-forming of the members 22 and 23. The assembly further includes an outer bearing ring R which has a radially outwardly extending flange portion to permit attachment to the support member of a suspension system. The member 23 also has an outwardly directed radial flange portion 23a for attachment, for example to a wheel of the vehicle.

Figure 5:
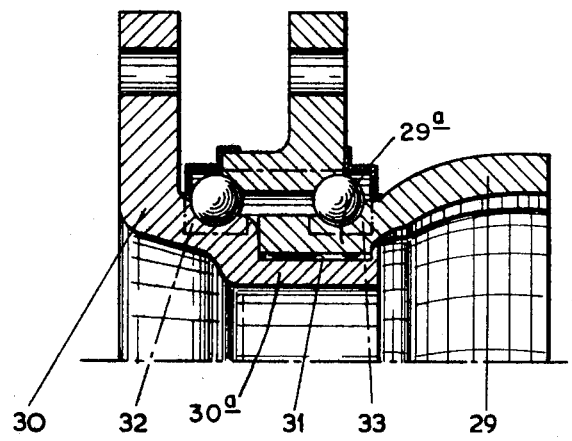
FIG. 5 is a modification of the assembly shown in FIG. 4.

There is shown in FIG. 5, a modified form of the assembly shown in FIG. 4. This assembly also includes an axle consisting of two parts pressed out of sheet steel, a bowl-shaped part 29 and a shell-shaped part 30. In the present instance, the member 30 has a cylindrical extension $30^a$ with exterior screw threads to mate with an extended cylindrical portion $29^a$ of the member 29 whereby the parts may be joined together in the manner shown. The inner raceways or bearing surfaces for the two rows of balls are ground in the outer surface of the members 29 and 30 respectively as at $33^a$ and $32^a$. These surfaces, in lieu of being ground, inner raceway surfaces may be provided by a pair of rings 32 and 33 which seat in recessed portions of the members 29 and 30. Of course, it is to be understood that the material of the parts 29 and 30 may be different from one another, and this is also true of the embodiment shown in FIG. 4.

There is shown in FIG. 6 another embodiment of axle-bearing assembly in accordance with the present invention. In this embodiment the axle body consists of two parts which may be pressed out of sheet steel, a bowl-shaped member 52 forming part of the homokinetic coupling and a shell-shaped member 53, the members having radially inwardly directed flange portions $52^a$ and $53^a$ respectively whereby they may be integrally joined by means of welding or rivets. In this embodiment the inner and outer rows of balls ride on raceways 55 and 57 which are ground in the outer surface of the members 53 and 52 respectively. The assembly also includes an outer ring 59 having a radially outwardly extending flange portion 61 whereby the outer ring may be attached to the support member of a vehicle. In this embodiment the member 53 has a radial flange 35 with a series of circumferentially spaced openings to accommodate bolts 36 for attachment to a wheel and also to support a brake disc 37. This arrangement provides a very compact design. In order to prevent the heat produced by braking from damaging the bearings, the disc has been provided with radial cooling channels 38 and an offset transition 39.

The embodiment of the invention shown in FIG. 7 is similar in overall design to the previously described embodiment except that in the present instance the brake disc 41 is formed integrally with the flange of the member 83 and the shell member is connected to the bowl 92 by means of a threaded connection as at 94. Note that in the present instance the inner raceways are formed by an inner ring 96 and a ground surface on the cylindrical extension 98 of the bowl-shaped member 92.

In all the designs according to the invention is broken with the traditional construction in which a nut is always present at the end of the axle. Said nut has now become completely superfluous.

Should a defect occur in the bearing design according to the invention, then the attachment of the right most flange to the bearing element should be loosened, after the detachment of wheel and brake disc or brake drum, all of them being on the leftmost flange of the types shown in the figures, when the whole unit can be removed and replaced by a new unit.

During the manufacturing, the balls can be placed in the usual way via an opening lying in the unballasted zone.

The greater compactness of the construction of the axle which has become possible by having placed all the parts closer together and having made them smaller also makes it possible for the center of the homokinetic coupling to be brought nearer the wheel face because of which the designer has a greater freedom in determining the correct steering geometry for the vehicle.

I claim:

1. A driven wheel mounting assembly for a vehicle having a support member, an axle member forming part of a homokinetic coupling, a common outer ring for at least two rows of rolling elements including means to detachably secure the outer ring to the support member, said common outer ring and means for securing the outer ring to the support member being one piece, flange means for detachably attaching a driven wheel of the vehicle to the axle, means defining an inner raceway surface on the axle for the rows of rolling elements characterized in that said flange means, axle and inner raceway means form an integral unit, said flange means and means for securing the outer ring to the support member being closely spaced axially to minimize the moment load on the assembly.

2. A driven wheel mounting assembly as claimed in claim 1, characterized in that the bearing surfaces have been ground into the material of the axle.

3. A driven wheel mounting assembly as claimed in claim 1, with at least one inner ring, characterized in that this has been locked by the nondetachable attachment of the outer flange to the axle.

4. A driven wheel mounting assembly as claimed in claim 1, characterized in that the axle together with the part of the coupling has been manufactured as a pressing.

5. A driven wheel mounting assembly as claimed in claim 4 characterized in that the axle consists of two shell- or bowl-shaped pressings that are attached to each other with their bottom planes standing perpendicularly on the central axis of the axle.

6. A driven wheel mounting assembly as claimed in claim 4 characterized in that the axle consists of two parts attached to each other nondetachably with cylindrical plans and the one part of which is forming a whole with the flange for the wheel and the other part is forming a whole with the clutch housing and of which each of these parts are forming an inner bearing surface for the rows of rolling elements.

7. A driven wheel mounting assembly as claimed in claim 1 characterized in that the brake disc or drum has been nondetachably attached to said flange means.

8. A driven wheel mounting assembly as claimed in claim 7 characterized in that the brake disc or drum is formed integrally with said flange means.

9. A driven wheel mounting assembly as claimed in claim 7 characterized in that the brake disc or drum has been attached to the inside of said flange means.

10. A driven wheel mounting assembly for a vehicle having a support member, an axle member forming part of a homokinetic coupling, an outer ring for at least two rows of rolling elements including means to detachably secure the outer ring to the support member, flange means for detachably attaching a driven wheel of the vehicle to the axle, means defining an inner raceway surface on the axle for the rows of rolling elements characterized in that said flange means, axle and inner raceway means form an integral unit, said flange means and means for securing the outer ring to the support member being closely spaced axially to minimize the moment load on the assembly, said axle member and part of the homokinetic coupling being manufactured as a pressing.

11. A driven wheel mounting assembly for a vehicle having a support member, an axle member forming part of a homokinetic coupling, an outer ring for at least two rows of rolling elements including means to detachably secure the outer ring to the support member, flange means for attaching a driven wheel of the vehicle to the axle, a brake disc nondetachably attached to said flange means, means defining an inner raceway surface on the axle for the rows of rolling elements characterized in that said flange means, axle and inner raceway means form an integral unit, said flange means and means for securing the outer ring to the support member being closely spaced axially to minimize the moment load on the assembly.